United States Patent [19]

Colasent

[11] 4,198,040
[45] Apr. 15, 1980

[54] ADJUSTABLE LID

[76] Inventor: Julius R. Colasent, 123 Farland Pl., Escondido, Calif. 92025

[21] Appl. No.: 965,700

[22] Filed: Dec. 1, 1978

[51] Int. Cl.² .................. B65D 41/06; A47J 36/06
[52] U.S. Cl. ................................. 220/254; 220/300; 220/302; 220/287
[58] Field of Search ............. 220/254, 287, 300, 301, 220/302

[56] References Cited

U.S. PATENT DOCUMENTS

| | | | |
|---|---|---|---|
| 1,060,100 | 4/1913 | King | 220/300 |
| 1,317,045 | 9/1919 | Shawley | 220/287 |
| 1,786,722 | 12/1930 | Reid | 220/301 |
| 2,760,672 | 8/1956 | Cronheim | 220/287 |
| 2,781,148 | 2/1957 | Reddle | 220/300 |

FOREIGN PATENT DOCUMENTS

| | | | |
|---|---|---|---|
| 419486 | 1/1911 | France | 220/287 |
| 420283 | 1/1911 | France | 220/287 |
| 66094 | 7/1913 | Switzerland | 220/287 |
| 23693 | of 1910 | United Kingdom | 220/287 |
| 605906 | 8/1948 | United Kingdom | 220/287 |

Primary Examiner—George E. Lowrance
Attorney, Agent, or Firm—Duane C. Bowen

[57] ABSTRACT

An adjustable lid for a pan including: (a) a central circular member and an outer annulus, (b) annular ribbing reinforcing said lid and engaging said pan against dislodgement, (c) the bottom of the lid sloping to a location medial of the edge and center of the central member so that condensation will tend to drip from that location into the pan, and (d) securing means between the central member and annulus including undercut slots on one and ears on the other latching by relative rotation of the central member and annulus, and manually operable spring clip means holding the members secured.

2 Claims, 5 Drawing Figures

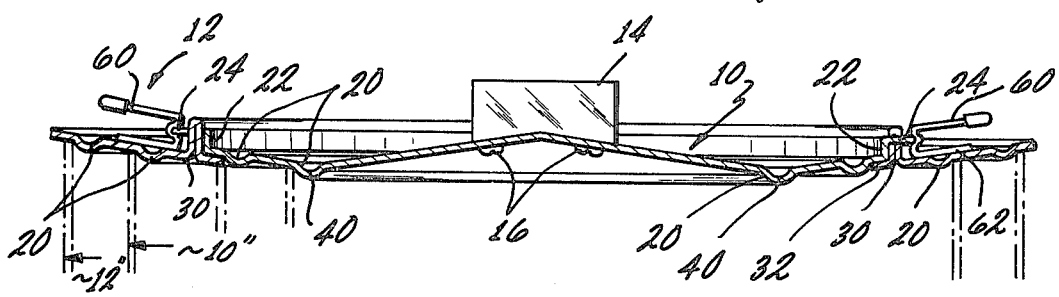
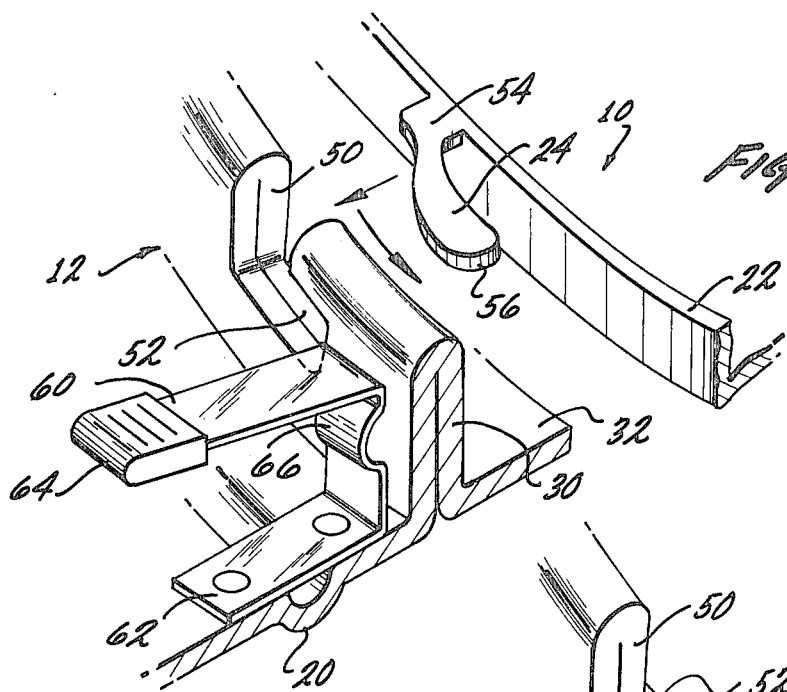
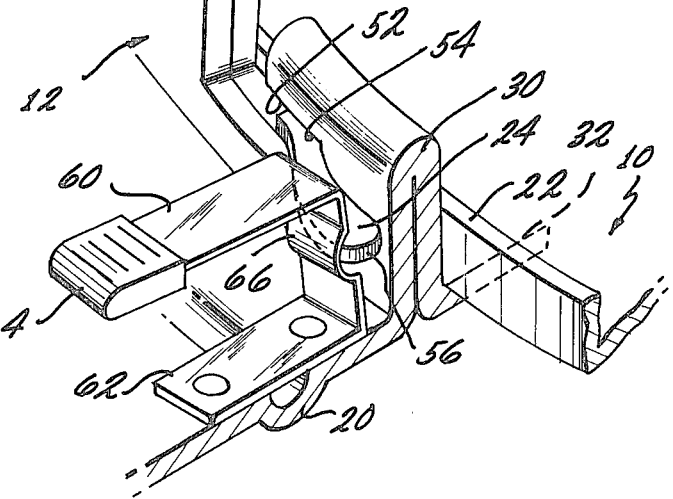

ADJUSTABLE LID

CONCISE SUMMARY OF INVENTION AND OBJECTIVES

My invention relates to a lid adjustable for use with a range of sizes of pans or the like.

Cookware such as pots, pans and skillets, etc., when sold in sets, have covers or lids provided for them. However, most cookware of this type, when sold separately, do not come with matching lids or covers, nor are there any manufactured for them. Most of the cookware varies in size at the top lip, therefore many existing lids or covers fit only the sets they came with. Cookware should be covered or lidded during use to prevent fire, loss of moisture and waste of energy. It is an objective of my invention to provide an adjustable lid for pans or the like needing lids. By "adjustable", I mean to provide a lid serviceable with a range of sizes of pots.

Independent of availability of lids of various sizes, understandably it would be convenient to have a few lids to fit many pots rather than having to procure a different sized lid for every pot. Certain problems have to be solved in constructing adjustable lids, however, such as suitable engagement of the lid on the pan against dislodgement, providing means to insure dripping of condensate from the underside of the lid will be within the pot, devising a structure which will be very practical to manufacture from the viewpoints of economy and adaptability to suitable manufacturing tooling, equipment and processes, providing a structure that can be readily cleaned and is durable in use and during cleaning operations, etc., and it is an additional objective of my invention to solve these problems.

A preliminary examination search has been conducted and the searcher cited the following U.S. patents (none of which were familiar to me):

| | |
|---|---|
| 1,524,185 | 1,210,284 |
| 1,441,712 | 1,322,863 |
| 1,193,116 | 1,317,045 |
| 1,361,348 | |

Although these patents variously concerned adjustable lids, their constructions were distinct from mine.

My invention will be best understood, together with additional objectives and advantages thereof, from the following description, read with reference to the drawings in which:

FIG. 3 is like FIG. 2 but with the annulus in place.

FIG. 4 is a partial perspective view, partly in section and enlarged, showing locking parts of central member and annulus in approaching dispositions.

FIG. 5 is like FIG. 4 but with the locking parts engaged.

Figure 1:
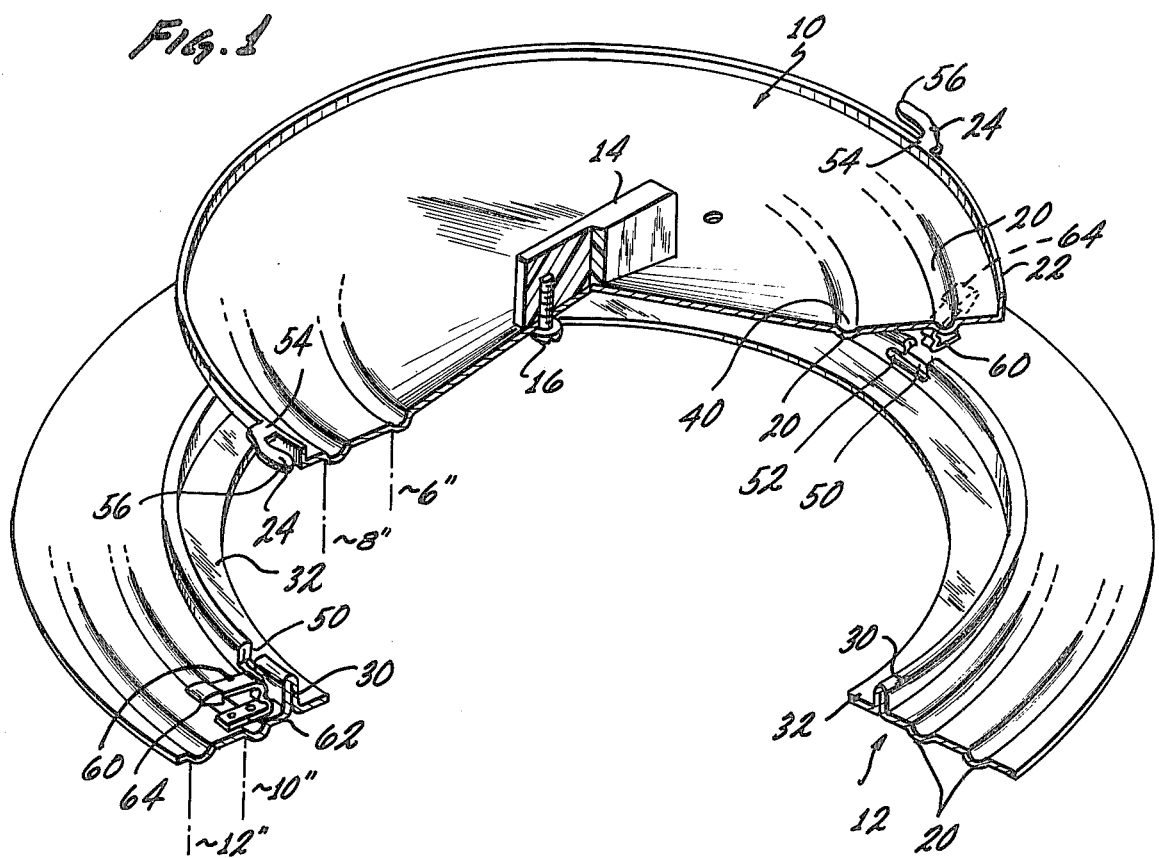
FIG. 1 is a perspective view of a specific embodiment of my new lid, which includes a central member and an annulus shown separated, certain portions being broken away and shown in section to better reveal the structure.
Figure 2:
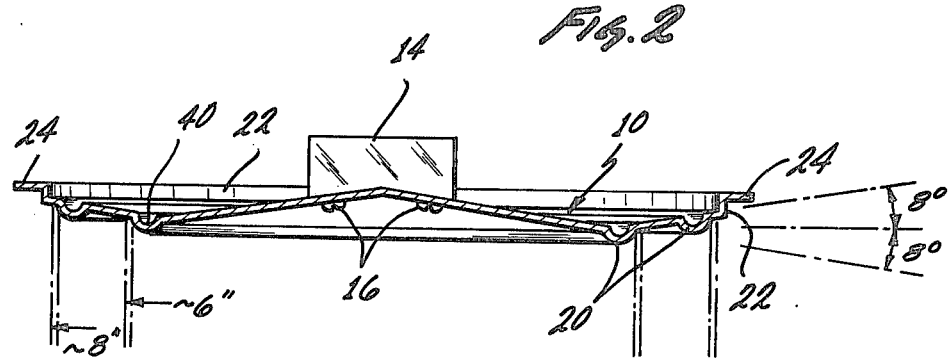
FIG. 2 is an elevational view, partly in section of the central member.

My adjustable lid is designed to cover or lid most of the presently manufactured pots, pans or skillets. The center lid will fit most cookware from 6" to 8" inclusive of most sizes in between. When the extending annulus is added to the center lid, it will then cover or lid cookware from 10" to 12", or larger, depending on how wide the extension ring is made. The design allows the extension ring to expand the center lid with ease. The extension ring will stay in place being held firmly with two lock ears and two spring locks. Two or three such adjustable lids in a kitchen would cover or lid most of the cookware used. My construction is designed to return the condensate and grease back into the cookware. It is easy to add or remove the extension ring, keep clean and store.

There are two main pieces: the inner cover and the extension ring. The materials used on all parts must be strong enough for normal kitchen use, sanitary and heat resistant. Teflon can be used on the seat between inner and outer parts. The labor and material used are nominal which makes the lid a very saleable item.

To more specifically describe my structure, the two principal, generally coplanar parts, are the circular, generally planar central member 10 and at least one generally planar annulus 12 having an inner diameter close to the outer diameter of central member 10. Central member 10 can be used separately or members 10 and 12 can be used together to serve as a lid for a pan or other cooking utensil. Aluminum or stainless steel are suitable materials from which to fabricate my adjustable lid. A handle 14, which may be made of low heat transferring material such as a wood or a plastic, is secured to the top of central member 10 by screws 16.

Central member 10 and annulus 12 have a series of annular ribs 20 on their lower surfaces (annular grooves on their upper surfaces) that serve several purposes. One purpose is that working of metal may strengthen the material or may take out stresses that might distort or warp the metal during heating. A second purpose is that ribbed structures are often stronger or better able to resist warping due perhaps to having more sturcture in the z-dimension. A further and primary advantage of having ribs 20 is to provide seats or abutments for the rims of various sized pans and the spacing of ribs 20 may depend primarily on the common diameters of pans, such as those mentioned above in inches. Presumably for foreign markets there are metric standard (round) pan diameters. Note that ribs 20 don't necessarily have to match the pan inner or outer diameter exactly but rather ribs 20 provide an abutment against too easy lid dislodgement. Preferably a rib 20 would be located inside the pan rim so that nearby condensate would tend to drip into the pan.

Central circular member 10 preferably has an outer edge formed by an upright annular flange 22. A plurality of ears 24, to be described in more detail later, have the form of continuations of flange 22 cut and struck out to horizontal dispositions.

The inner edge of annulus 12 is formed with an upright reverse bend 30 and then terminates in an inwardly extending annular ledge 32 on which the outer edge of central member 10 is seated. Independently of other functions, it will be understood that upright flange 22 on central member 10 and reverse bend 30 on annulus 12 strengthen the structure and resist warping compared with merely flat surfaces.

The under surface of central member 10 slopes from the center to a medial annular location 40 and from its periphery to annulus 40, and the under surface of annulus 12 likewise slopes toward location 40. This means that condensed moisture, fats, etc., forming on the underside of the lid will tend to flow to a location about at 40 (which also usually will be the location of one of the ribs 20) and will drip into the pan. This means that annular location 40 perferably should be about the minimum pan diameter to be serviced by the adjustable lid.

Reverse or return bend 30 on annulus 12 has a second function in that it is cut with an upwardly open slot 50 with an undercut end at 52 which receives ear 24 that secures in the undercut end 52 of slot 50 by a turning moment of annulus 12 relative to central member 10. It is actually the inner web 54 of ear 24 that fits in slot 50 but the ear portion proper 56 leads tangentially to the outside of slot 50 where it is frictionally engaged by a spring clip 60. Spring clips 60 are secured at lower ends 62 (by rivets, spot welding or whatever is applicable) to the upper surface of annulus 12 and have a manually operable tab 64 at the upper end. Clips 60 have central shaping including a return bend 66 to engage ears 56 to tend to latch the ears in place and hence to keep annulus 12 secured to center section 10. Ears 56 have cam surfaces to ease engagement and disengagement with the complementary portion of clips 60.

It can be seen from the foregoing that annulus 12 can be readily installed on central member 10 or disengaged therefrom by use of ears 24, slots 50 and spring clips 60.

As rib location 40 fits the smallest pan size, this means that moisture or fat condensate on the underside of the lid will always tend to drain toward location 40 no matter what size pan is involved. As indicated in the drawings, a slope from the horizontal of 8° is suitable from the center of member 10 to location 40 and from the periphery of member 40 to location 40. Similarly, an inward slope of the bottom of ring or annulus 12 of about 8° is suitable.

Two inch increments in cooking utensil sizes from 6" to 12" are indicated in the drawings. These are approximate or nominal dimensions. Note in each case rib 20 should fit inside the lip of the corresponding pan, so condensate will drip inside the pan. If the rib 20 corresponding to the pan size fit on the outside of the pan, some condensate would tend to flow to the outside of the pan and to drip or drain outside of the pan which would be undesirable from various viewpoints such as mess, loss of moisture, danger of fire, etc. Cooking utensils having a nominal dimension, such as 8" for example, will be found to have a range of interior diameters, to the inner side of the utensil lip, inside of which the outside of the associated rib 20 should fit. A quarter inch allowance is suggested from my experience to date. This would mean that the outer diameters of the ribs shown in the drawings should have maximum diameters of 5¾", 7¾", 9¾" and 11¾".

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. An adjustable lid for a cooking utensil or the like, comprising:
   (a) a circular central member and at least one annulus having an inner diameter close to the outer diameter of said central member, together to form a cover for such utensil,
   (b) securing means between said central member and said annulus including a plurality of slots in one and a plurality of ears on the other fitting in said slots, said ears locking in said slots by a turning movement of said annulus relative to said central member to hold said annulus and said central member generally coplanar,
   (c) said central member being generally planar and said annulus being generally planar and said annulus having an upright return bend near its inner margin and a ledge leading from said return bend to form a seat for the peripheral edge of said central member in said annulus, and
   (d) said slots being formed by upwardly open cuts in said return bend that terminate in undercuts at one end and the outer edge of said central member terminating in an upright flange and said ears being formed as continuations of said flange that are cut and struck out with an inboard web and an ear portion leading tangentially from said web, said ears engaging in said slots by engaging said webs in said upwardly open cuts and then advancing said webs into said undercuts, with said ear portion outlying said undercuts, at least one spring clip secured at one end to the top of said annulus and having a manually operable tab on the other end and said spring clip making a return bend between said ends, said bend frictionally engaging one of said ears to latch the same in the undercut end of the associated slot.

2. The subject matter of claim 1 in which said central member has a handle secured centrally to its upper surface, said central member having annular reinforcing ribs formed therein producing annular upper groove and annular lower protrusion that help center the lid on such utensil or the like against dislodgement, the lower surface of said central member downwardly sloping from its center and from its periphery to a medial annular location so that condensation on the lower surface of said central member will tend to flow to said annular location and drip from there into such pan or the like, and the lower surface of said annulus inwardly downwardly sloping to direct condensation inwardly and having reinforcing ribs like those in said central member.

* * * * *